US006563629B2

(12) United States Patent
Ghera et al.

(10) Patent No.: US 6,563,629 B2
(45) Date of Patent: May 13, 2003

(54) METHOD AND APPARATUS FOR FULL C-BAND AMPLIFIER WITH HIGH DYNAMIC GAIN RANGE

(75) Inventors: Uri Ghera, Tel Aviv (IL); Yoav Sintov, Petach Tivka (IL); Reuven Zaibel, Gan Yavne (IL)

(73) Assignee: REDC Optical Networks Ltd., Tel Aviv (IL)

( * ) Notice: Subject to any disclaimer, the term of this patent is extended or adjusted under 35 U.S.C. 154(b) by 0 days.

(21) Appl. No.: 09/963,444

(22) Filed: Sep. 27, 2001

(65) Prior Publication Data

US 2002/0181079 A1 Dec. 5, 2002

Related U.S. Application Data

(60) Provisional application No. 60/310,867, filed on Aug. 9, 2001, and provisional application No. 60/291,614, filed on May 18, 2001.

(51) Int. Cl.[7] ................................................ H01S 3/00
(52) U.S. Cl. .................................................... 359/337.1
(58) Field of Search ......................... 359/337.1, 337.11, 359/337.4, 337

(56) References Cited

U.S. PATENT DOCUMENTS

| | | |
|---|---|---|
| 5,225,922 A | 7/1993 | Chraplyvy et al. |
| 5,276,543 A | 1/1994 | Olshansky |
| 5,351,325 A | 9/1994 | Miller et al. |
| 5,514,413 A | 5/1996 | Van't Hof et al. |
| 5,696,615 A | 12/1997 | Alexander |
| 5,812,710 A | 9/1998 | Sugaya |
| 5,963,291 A | 10/1999 | Wu et al. |
| 6,049,413 A | 4/2000 | Taylor et al. |
| 6,055,092 A | 4/2000 | Sugaya et al. |
| 6,061,171 A | 5/2000 | Taylor et al. |
| 6,215,581 B1 | 4/2001 | Yadlowsky |
| 6,466,364 B1 * | 10/2002 | Vakoc et al. ............. 359/337.1 |
| 2001/0017728 A1 | 8/2001 | Kitabayahi et al. |

OTHER PUBLICATIONS

"Erbium–doped Fiber Amplifiers", P. C. Becker, et. al., p. 335–346, Academic Press, 1999.
M.J. Yadlowsky "Independent control of EDFA gain shape and magnitude using excited state trapping", J. of Lightwave Technology, vol. 11, No. 5, p. 539 (1999).
Optical Fiber Communication Systems, L. Kozovsky, et. al., p. 578–584, Artech House, 1996.
DWDM Technology, S. V. Kartalopoulos, p. 75–77, SPIE Press, 2000, Kartalopoulos, ibid. p. 78.
S. D. Jackson et. al. in "Theoretical modeling of Tm–doped silica fiber lasers", J. of Lightwave Technology, vol. 17, No. 5, p. 948 (1999).
Planar Tapped Delay Line Based, Actively Configurable Gain–Flattening Filter, Ranalli et al, pp. 21–22.
Fiber Based Acousto–optic filters, Kim et al, TuN4/199–TuN4–3/201.
"Optical Networks", R. Ramaswami, et al., p. 101–102, Academic Press, 1998.

* cited by examiner

*Primary Examiner*—Mark Hellner
(74) *Attorney, Agent, or Firm*—Mark M. Friedman (57) ABSTRACT

A method and apparatus for optical amplification with a large dynamic gain range in both the non-linear (1530–1540 nm) and linear (1540–1565 nm) regimes of the C-Band. The large dynamic gain range is achieved by the synergistic operation of a dual-stage Erbium-doped Fiber Amplifier (EDFA) having a self-saturating Thulium-doped fiber inserted between the two stages. The Thulium-doped fiber saturation is determined by the output power of the first EDFA stage, and the synergistic, combined operation of both EDFA stages and the self-saturating absorber is controlled by appropriate algorithms and software.

15 Claims, 12 Drawing Sheets

METHOD AND APPARATUS FOR FULL C-BAND AMPLIFIER WITH HIGH DYNAMIC GAIN RANGE

CROSS REFERENCE TO RELATED APPLICATIONS

The present application claims the benefit of priority from U.S. Provisional Application No. 60/291,614, filed May 18, 2001, and U.S. Provisional Application No. 60/310,867 filed Aug. 9, 2001, the contents of which are incorporated herein by reference.

FIELD AND BACKGROUND OF THE INVENTION

The present invention relates generally to optical amplifiers used in fiber optics for telecommunications. More particularly, the invention relates to an optical fiber amplifier and a method and apparatus for spectral equalization of multi-channel amplified output at multiple gain values.

In optical communication systems using wavelength division multiplexing (WDM) several streams of information, each at different wavelength channel are being transmitted. This information is typically transmitted along an optical fiber.

In all fiber optic cables, the cumulative and combined effects of absorption and scattering attenuate the transmitted signals. Information is usually transmitted through fiber optic transmission lines using laser wavelengths of 1530–1565 nm—the so called C-Band wavelength region, and 1570–1620 nm—the so called L-Band wavelength region, where there are low attenuation loss windows. Although the signal attenuation rate in optical fibers is low within these bands, signal reduction with increasing transmission distance requires periodic signal amplification for long distance transmission.

In these systems, an Erbium-doped fiber amplifier (EDFA) is the most commonly used device to amplify all wavelengths simultaneously ["Erbium-doped Fiber Amplifiers", P. C. Becker, et. al., p. 335–346. Academic Press. 1999]. Due to the atomic properties of the Erbium ions in the silica fiber, the gain obtained by each of the wavelengths is different, and thus signals that enter with the same power into the amplifier can exit with power differences that can reach a few decibels ["Optical Fiber Communication Systems", L. Kozovsky, et. al., p. 578–584, Artech House, 1996]. Two spectral regimes of amplification within the C-Band wavelength region are known: A) 1530–1540 nm, and B) 1540 nm–1565 nm. The wavelength dependent amplification behavior in regime A is relatively linear, while the amplification in regime B is non-linear, due to the non-uniform spectroscopic behavior of the Erbium ion. The simultaneous existence of linear and non-linear gain regimes in the EDFA render the task of gain equalization over a wide range of gains extremely difficult. An amplifier that is not gain-equalized can have several serious consequences for the communication system, including a non-optimized power budget for a system operating in the entire C-Band Spectral range. Furthermore, in the case of a chain of a few amplifiers, each amplifier can enhance the power non-uniformly, and, in extreme cases, the wavelengths with smallest gain may be undetectable. Other serious consequences include cross-talk that can occur after traversing optical filters in components such as optical multiplexers or optical demultiplexers, and a non-optimized use of the population inversion of the Erbium-doped fiber amplifier because of strong amplified spontaneous emission radiation, or noise, in the strongly amplified wavelengths.

For the reasons mentioned above, a need for a gain equalization filter was identified by A. R. Charplevy (Charplevy et al., U.S. Pat. No. 5,225,922). Gain equalization is usually applied for a limited gain range (1–2 dB) across the full C-Band and is accomplished by means of passive filters with devices such as thin-film filters ["DWDM Technology", S. V. Kartalopoulos, p. 75–77, SPIE Press, 2000], Bragg gratings [Kartalopoulos, ibid. p. 78], long period gratings, and tapered fibers ["Optical Networks", R. Ramaswami, et al., p. 101–102, Academic Press, 1998].

In dual-stage amplifiers there are other ways to achieve gain equalization, including choosing different types of Erbium fiber for the two stages (Sugaya et al., U.S. Pat. No. 6,055,092), different lengths of Erbium fiber (Alexander, U.S. Pat. No. 5,696,615), or by inserting devices such as filters, isolators or even attenuators between the two stages (Taylor, et al., U.S. Pat. No. 6,061,171; Alexander, U.S. Pat. No. 5,696,615). Dynamic filters, using acoustically tuned optical amplifiers, have also been suggested ("Fiber Based Acousto-optic Filters", B. Y. Kim, et al., OFC 99, TuN 4, p. 199–201, Olshansky, U.S. Pat. No. 5,276,543).

In all the cases mentioned above, the gain equalization filter is usually suitable for a predetermined amplifier gain. When there is a need to change the gain, the power equalization of the different wavelengths will degrade and no longer be optimal.

Another conventional way to achieve dynamic gain equalization is by using two amplifier stages with opposite gain tilts [Yadlowsky M. J., U.S. Pat. No. 6,215,581]. Opposite tilt signs are achieved by differentiating the optical pump level for each of the stages. However, it is well known that in this case the dynamic gain equalization range, within a specific flattening tolerance, is limited.

As the equality of the power levels is important, in many applications an attenuator is inserted in front of the amplifier (Sugaya, U.S. Pat. No. 5,812,710) or between the amplifier's stages (Taylor, U.S. Pat. No. 6,049,413), to lower the signal power and accommodate the need for optimized gain for power equalization. However, it is well known to those skilled in the art that this technique wastes energy, and degrades the amplifier's signal to noise characteristics.

Recently, commercial devices for dynamic gain equalization have been developed. These devices utilize dynamic filters based on acousto-optic filters (Pearson, U.S. Pat. No. 5,514,413), liquid crystal filters (Kuang-Yi Wu, U.S. Pat. No. 5,963,291) and Mach-Zehnder filters (Miller, U.S. Pat. No. 5,351,325, Ranalli et. al., "Planar tapped delay line based, actively configurable gain-flattening filter", ECOC 2000, Vol. 3, p. 21). These devices have been employed in conjunction with optical amplifiers. However, they are cumbersome, suffer high insertion loss, require high power resources, are not "stand-alone", and necessitate wavelength monitoring of the amplifier output in order to reach gain equalization.

Active gain tilting elements are presently employed for compensating for the linear gain regime B (1540–1564 nm) in EDFAs. Commercial companies such as Chorum and Sumitomo manufacture such components. However, it is important to emphasize that with these elements, high dynamic gain equalization can be achieved only in this linear spectral gain regime. Moreover, these elements require wavelength monitoring means, as well as complicated performance control means.

The use of a Thulium-doped fiber (Tm-fiber) as a passive gain tilting element at the output or inside an optical amplifier operating in the linear gain regime (1540–1564), was suggested by Kitabayashi et. al (U.S. patent application Ser. No. 20010017728A1, "Active gain-tilt compensation of EDFA using Thulium doped fiber as saturable absorber", and ECOC 2000, Vol. 2, p.177). The Tm-fiber's linear absorption characteristics, described by S. D. Jackson et. al. in "Theoretical modeling of Tm-doped silica fiber lasers", J. of Lightwave Technology, Vol. 17, no. 5, p.948 (1999), are exploited for compensating for the Erbium fiber's linear wavelength-gain dependence between 1540–1564 nm. The gain tilt of the Er-doped fiber and the loss tilt of the Tm-fiber are both linear with respect to the wavelength at 1540–1564 nm. The slopes of these linear tilts have opposite signs and their absolute values are similar (Kitabayashi et. al, above). However, the Tm-fiber compensates for the EDFA gain tilt only in the linear gain regime between 1540 nm and 1564 nm, where the Erbium wavelength-gain dependence is linear. Thus, this method is not suitable for compensating for the non-linear Erbium fiber regime in the 1530–1540 nm spectral region. Since present day communication systems operate in the full C Band (1530–1565 nm), any partial solution for gain equalization (for example—gain flattening of only part of the spectrum) render such Tm-fiber/EDFA system practically useless.

A method utilizing excited state trapping in Erbium-doped Fluoride fiber has also been reported (M. J. Yadlowsky "Independent control of EDFA gain shape and magnitude using excited state trapping". J. of Lightwave Technology, Vol. 11, no. 5, p. 539 (1999)). However, it is well known to those skilled in the art that Fluoride fibers are not preferred in communication systems, due to their short degradation time and splice problems. In summary, there is at present no known low cost and simple solution for a dynamic gain equalized EDFA useful for the entire C-Band.

There is thus a widely recognized need for, and it would be highly advantageous to have, a dynamic gain equalizer for an EDFA based on fiber technology. The EDFA spectral shape should change dynamically, to simultaneously equalize the gain of all employed WDM channels in the entire C-Band, namely between 1530 nm–1565 nm, with a wide dynamic gain range.

SUMMARY OF THE INVENTION

The present invention is of a dynamic gain equalizer for a rare-earth doped amplifier, specifically an Erbium-doped Fiber Amplifier (EDFA). The dynamic gain equalizer is preferably based on the combined use of dual-stage amplifier basic bloc comprised of a Tm-fiber optically connected between two Erbium-doped fiber amplifier stages, constructed from identical or (spectrally, lengthwise, etc.) different Erbium-doped fiber types, and the use of active control of the elements of this basic bloc. In the following, we will refer generically to the two stages as "first stage" and "second stage", with the understanding that if the amplifier has more than two stages, the basic bloc used to explain the invention herein is repeated. Also, the order of the stages is not meant to be limiting, and it is possible to change it, so that the terms "first" and "second" may be interchanged. The relevant aspect is that an output signal power from the "first" stage induces the saturation in a self-saturating absorber, specifically a Tm-fiber connected to this first stage.

The present invention provides a way of dynamically equalizing the gain across both the linear and non-linear regimes of the C-Band simultaneously. That is, the spectral response will be maintained relatively flat when the gain of the EDFA is changed, when the input power to the EDFA is changed while the gain is kept constant, or when the gain and input power are changed simultaneously. The present invention reaches these goals by preferably utilizing Erbium and Thulium-doped fibers together with extensive software algorithms, which control the pump power delivered to different portions of the Erbium doped fiber.

The present invention is also related to the extension of the wavelength-dependent gain range values, in which a dual (or multiple) stage EDFA output is flattened, within a specific tolerance.

Figure 1:
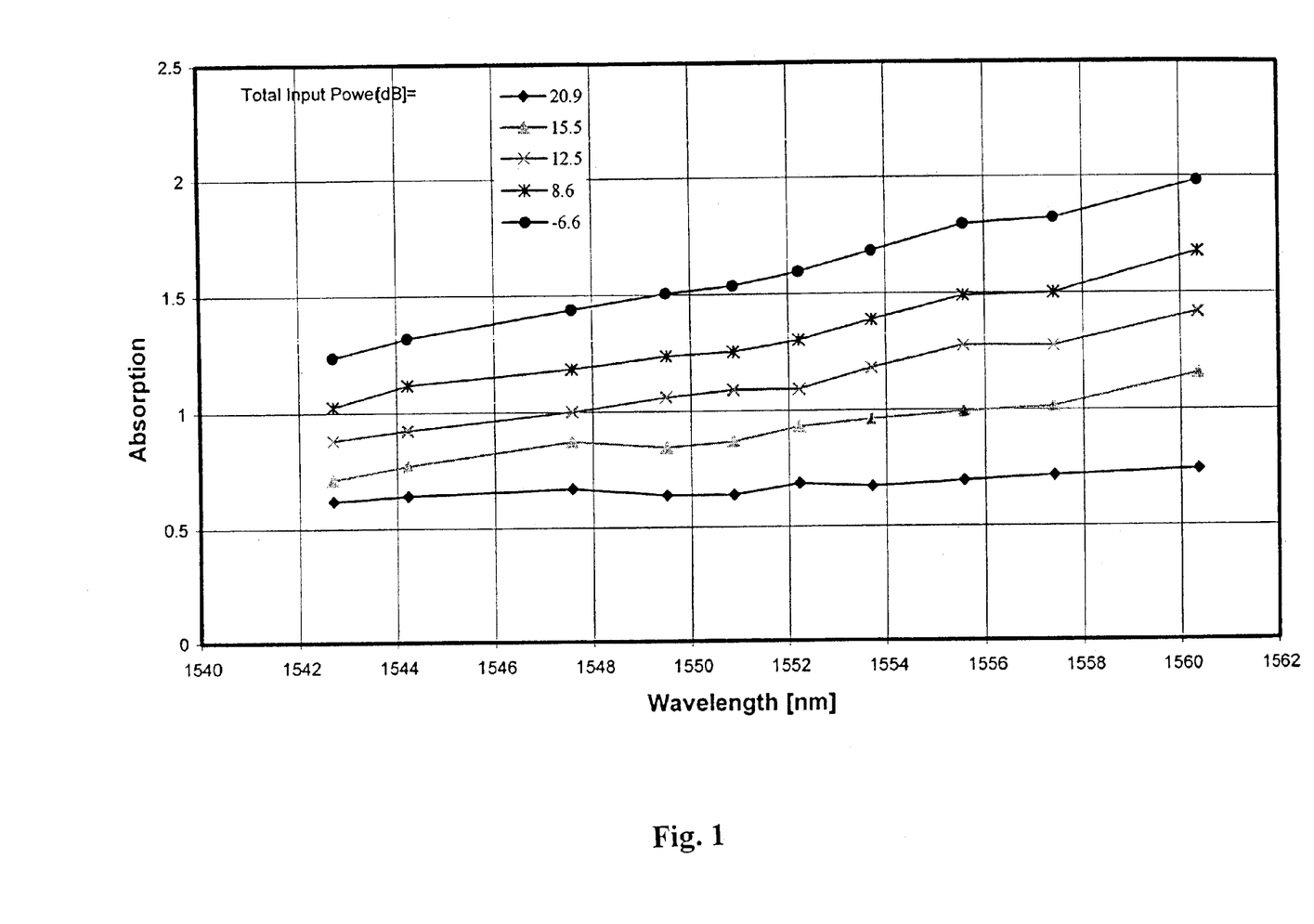
FIG. 1 shows the typical absorption of a 1.3 m long Tm-doped silica fiber for various input powers and 10 channels in the C-band.

The mechanism proposed is based on the tandem characteristics of an Erbium doped fiber and a Tm-fiber in a dual or multiple-stage EDFA. The Tm-fiber is employed in this embodiment as a self-saturable absorber. When low power is inserted into the Tm-fiber, the fiber functions as an optical filter with a large slope of linear wavelength-dependent loss, and with a certain level of excess loss (FIG. 1). The higher the power entering the Tm-doped fiber, the lower is the slope of the wavelength-dependent loss and the smaller is the excess loss level (FIG. 1). The saturation characteristics of a Tm-doped Silica fiber between 1530 nm–1605 nm is described by S. D. Jackson et. al. in "Theoretical modeling of Tm-doped silica fiber lasers", J. of Lightwave Technology, Vol. 17, no. 5, p.948 (1999). However, as mentioned above, since the spectral gain profile of the EDFA is linear only between 1540–1565 nm. the mutual saturated absorption/emission characteristics of the EDFA's Erbium doped and Thulium-doped fibers are absolutely required for achieving high dynamic gain equalization within the whole C-Band range.

When constructing a dynamic gain EDFA, which is gain-flattened at the full C-Band range for a wide range of gains (typically 6–12 dB), the wavelength dependent saturated gain and absorption of the combination of Erbium and Thulium fibers has to be carefully considered. Generally, the Erbium fiber section can perform dynamic gain equalization mainly in the non-linear regime of the EDFA (namely 1530–1540), while the combined saturation characteristics of Thulium and Erbium fiber perform the gain equalization in the linear regime (namely 1540–1565 nm). However, only a synergistic combination of three factors: a) the lengths of the Erbium and Tm doped fibers comprising each of the EDFA stages, b) the spectral characteristics of each Erbium doped fiber controlled by its pump level, and c) the wavelength dependent absorption of the Thulium, can perform dynamic gain equalization over the entire C Band.

In the high gain range (highly pumped first stage, thus high power signals entering the Tm-doped fiber and the amplifier second stage) the dual-stage amplifier gain tilt is reduced by the high power output signals exiting the first stage and saturating the mid-stage Tm-fiber and the weakly pumped second-stage Erbium fiber. The combination of the saturated Tm-fiber and the weakly pumped second stage Erbium fiber flattens the gain spectral profile in both the linear regime and the non-linear regime of the C-Band. Alternatively, in the low gain range (weakly pumped first stage, thus low power signals entering the Tm-fiber and the second stage), in which the gain tilt is negative, the first stage low power output signals experience a combination of small signal absorption in the Tm-fiber and of high spectral-dependent amplification in the second stage. This combination again flattens the gain spectral profile in both the linear and the non-linear regimes of the C-Band.

The main novel and inventive aspects of the method and apparatus of the present invention, in comparison with that of Kitabayashi et. al. (U.S. patent application Ser. No.

20010017728A1, and in ECOC 2000, Vol. 2, p.177), are summarized as follows: the present invention uses the self saturation of the Tm-fiber in a dual stage EDFA, which is induced by first stage output signals, combined with complementary gain spectral profiles of the two (or more) EDFA stages, which are achieved by controlling the pump level of each stage utilizing software algorithms, to yield a wide dynamic gain flattening over the entire C-Band. In contrast, in Kitabayashi's dual-stage EDFA, the Tm saturation level is controlled by an auxiliary diode externally (i.e. it is not self induced by the power exiting the prior EDFA stage). Kitabayashi's apparatus and method are essentially and ultimately based on the approximately linear and opposite tilts of the (externally controlled or pumped) Erbium and Tm-doped fibers, which hold only in the linear range (1540–1564 nm) of the C-Band. Thus, Kitabayashi's method cannot, in principle, achieve gain flattening over the entire C-Band.

According to the present invention there is provided a method for dynamic gain equalization in an optical fiber system, comprising: a) providing a plurality of rare-earth doped amplifier stages; b) providing a self-saturable absorber optically connected between each two of the plurality of rare-earth amplifier stages, each of the two stages including a first and a second stage; and c) synergistically controlling the pumping of the first and second stages and the saturation of the self-saturable absorber connected therebetween, whereby the combined action of the pumping and the saturation provides gain equalization over a wide spectral range covering the entire C-band.

According to the present invention there is provided an apparatus for dynamic gain equalization over the entire C-Band in an optical fiber system, comprising: a) a plurality of rare-earth doped amplifier stages, each two of the plurality of stages including a first and a second stage; b) a self-saturable absorber optically connected between the first and second amplifier stages, the self-saturable absorber having a saturation property controlled by an output signal of at least one of the first and second stages; and c) control means for controlling an optical property of each of the first and second stages, the control means facilitating a synergistic action of the first and second stages and the self-saturable absorber, whereby the synergistic action provides optical gain equalization over a wide spectral range covering the entire C-band.

According to the present invention there is provided a method for dynamically equalizing the optical gain across both the linear and non-linear regimes of the C-Band, comprising: a) providing at least one dual-stage Erbium doped fiber amplifier having a first stage and a second stage; b) optically connecting a Thulium-doped fiber between the first and second stages; c) synergistically controlling the spectral output of the first and the second stages; and d) using the spectral output of the first stage to affect an optical characteristic of the Thulium-doped fiber, the affected optical characteristic combining with the first and second spectral outputs to induce a substantially equalized gain across the C-Band.

The apparatus of the present invention can be used as a stand-alone device or in conjunction with a dichroic filter, or any other passive gain equalizing filter, and can be an important contributor for dynamic gain equalization in Erbium-doped fiber amplifiers.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a full C-Band dynamic gain equalizer for fiber optic communication systems having a spectral output that can be changed dynamically as needed, by adjusting one or more variable power lasers providing optical pumping. The principles and operation of the dynamic gain equalizer of the present invention may be better understood with reference to the drawings and the accompanying description. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Figure 2:
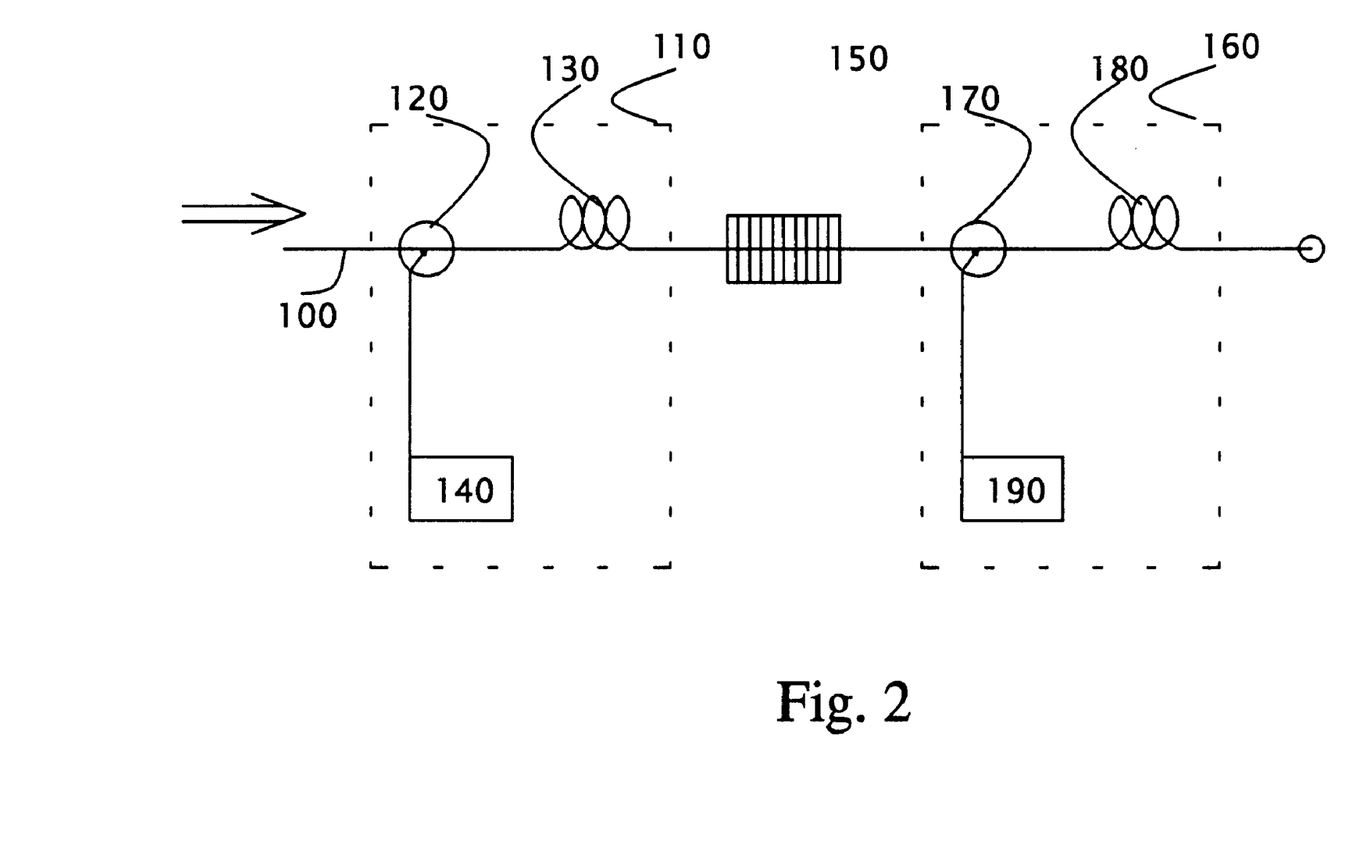
FIG. 2 illustrates a prior art dual-stage amplifier apparatus.

Referring now to the drawings, FIG. 2 illustrates a conventional prior-art dual-stage amplifier apparatus ["Erbium-doped Fiber Amplifiers", P. C. Becker, et. al., p. 273–277, Academic Press, 1999], where a transmission line 100 passes through a first amplifier stage 110, which comprises a first wavelength division multiplexing coupler 120, one or more Erbium-doped optical fibers 130, a first optical fiber line ("pump") 140 used to provide variable power laser light to pump Erbium into an excited state, and, optionally, a passive filter 150. The output signals of first stage 110 are further amplified by a second stage 160, which also comprises a second wavelength division multiplexing coupler 170, one or more Erbium-doped optical fibers 180, and a second optical fiber line (pump) 190 to provide variable power laser light to pump Erbium into an excited state. In the event that the second stage 160 is unable to provide the desired gain across some of the wavelengths, passive filter 150 can provide additional filtering to achieve equalization. As discussed earlier, optical fibers might be doped with other elements besides Erbium in order to provide a means of amplifying light at additional wavelengths, or as sensitizers for the Erbium ions.

A dual-stage amplifier can be operated in a regime in which the first stage has a negative gain tilt and the second stage a positive gain tilt and vice-versa. Each such mode of operation facilitates the power equalization of the signals with different wavelengths exiting the amplifier. When high gain is required, first stage 110 is highly pumped, its gain tilt (herein, a form of "spectral output") is positive, and second stage 160 compensates for this tilt by lowering its pumping level. Alternatively, when low gain is required, first stage 110 is pumped low, and its gain tilt is negative, while second stage 160 compensates for this negative tilt by increasing its pumping level. The overall gain tilts at the high and low gain edges of the amplifier's dynamic gain range (referred to herein as "high gain" and "low gain" respectively) are positive and negative, respectively.

Thus, Erbium-doped fiber amplifiers can have a certain dynamic gain range by having their pumping levels chosen selectively. However, within a required flattening tolerance, the maximum dynamic gain range obtained with existing configurations, as exemplified by FIG. 2, is limited. For two identical Erbium fibers forming the two amplifier stages, the dynamic gain range $\Delta G$ (in dB) is given by $$\Delta G = G_{max} - G_{min} = \frac{(\sigma_{e(\lambda 1)} + \sigma_{a(\lambda 1)}) + (\sigma_{e(\lambda 2)} + \sigma_{a(\lambda 2)})}{(\sigma_{e(\lambda 1)} + \sigma_{a(\lambda 1)}) - (\sigma_{e(\lambda 2)} + \sigma_{a(\lambda 2)})} \cdot \Delta T$$

where $G_{max}$ and $G_{min}$ are, respectively, the high and low edge of the gain dynamic range (in dB), ?T is the flattening tolerance (in dB), λ2 and λ1 are respectively the high and low edges of the signals spectral span, and $\sigma_{e(\lambda)}$ and $\sigma_{a(\lambda)}$ are respectively the effective emission and absorption cross sections of the Erbium fiber (including the overlap integrals influence). By using this formula, one can find the theoretical limit of the dynamic gain range of an amplifier with two stages, formed by identical Erbium fibers.

Beyond this limit, the gain equalization does not occur within the required flattening tolerance. Typically, for commonly used Erbium-doped fibers, the theoretical limit of the dynamic gain range, within 1.5 dB flattening tolerance, is about 3.5 dB at the most.

This limitation on the gain dynamic range, in which gain equalization can be achieved within the given tolerance ?T, depends on the Erbium fiber characteristics. An increasingly flatter spectral response leads to a wider dynamic range, or alternatively, to a lower tolerance.

With two different Erbium fiber types for first stage 110 and second stage 160, this limitation on the dynamic gain range can be alleviated by using different pump sets for first stage 110 and second stage 160, at each working point in the gain dynamic range. This can be seen in the following relation:

$$\Delta G = G_{max} - G_{min} =$$

$$\frac{((\sigma_{e1(\lambda 1)} + \sigma_{a1(\lambda 1)}) + (\sigma_{e1(\lambda 2)} + \sigma_{a1(\lambda 2)})) \cdot \overline{(n^*_{G_{max}} - n^*_{G_{min}})} \cdot L_1 +}{((\sigma_{e1(\lambda 1)} + \sigma_{a1(\lambda 1)}) - (\sigma_{e1(\lambda 2)} + \sigma_{a1(\lambda 2)})) \cdot \overline{(n^*_{G_{max}} - n^*_{G_{min}})} \cdot L_1 +} \cdot \Delta T$$

$$\frac{((\sigma_{e2(\lambda 1)} + \sigma_{a2(\lambda 1)}) + (\sigma_{e2(\lambda 2)} + \sigma_{a2(\lambda 2)})) \cdot \overline{(N^*_{G_{max}} - N^*_{G_{min}})} \cdot L_2}{((\sigma_{e2(\lambda 1)} + \sigma_{a2(\lambda 1)}) - (\sigma_{e2(\lambda 2)} + \sigma_{a2(\lambda 2)})) \cdot \overline{(N^*_{G_{max}} - N^*_{G_{min}})} \cdot L_2}$$

where $$\overline{n^*_G} \text{ and } \overline{N^*_G}$$

are average Erbium upper state population densities first stage 110 and second stage 160, respectively, needed for achieving the required gain (G); $\sigma_{e,a1(\lambda)}$ and $\sigma_{e,a2(\lambda)}$ are the effective emission and absorption cross sections of the Erbium fibers in first stage 110 and second stage 160, respectively (including the overlap integrals influence); and $L_1$ and $L_2$ are the first stage and second stage Erbium fiber lengths, respectively. By adjusting properly the pump each stage, the appropriate values of $$\overline{(n^*_{G_{max}} - n^*_{G_{min}})} \text{ and } \overline{(N^*_{G_{max}} - N^*_{G_{min}})}$$

for covering the dynamic gain range ($G_{min} \div G_{max}$) at tolerance $\Delta T$, can be achieved.

For a given pump limit, the larger the differences between the two Erbium fibers constituting first stage 110 and second stage 160, the wider the dynamic gain range. However, for achieving a flattened spectral yield at each working point inside the dynamic range, it is essential that the spectral shape of the cross sections of the two fibers be similar. Adding optical filter 150, customized for a specific dynamic range, between first stage 110 and second stage 160, lowers the demands from the pump diodes, and compensates for irregularities in the fibers spectral characteristics inside the spectral range.

The saturation characteristics of a typical 1.3 m long, Tm-doped silica fiber are shown in FIG. 1. The input signals to the fiber at all channels are identical for all measurements. The total input power varies from −6.6 dBm to 20.9 dBm. The Tm saturation at the high input power level causes an absorption tilt (namely, the change of absorption in dB at a certain wavelength relative to the high wavelength edge) value increase, from a negative value under small signal conditions (total input power −6.6 dBm), to a nearly flat absorption loss yield at saturation conditions (total input power 20.9 dBm). The Tm absorption tilt increases with total input power in the 1540–1565 nm linear regime, and compensates for the linear gain tilt increase trend in a dual stage dynamic gain EDFA operated near its high gain range edge. As a result, it is possible to extend a predetermined dynamic gain range value of a dual stage EDFA working in the C-Band linear regime (1540–1565 nm), by introducing a Tm-doped fiber at the mid-stage of the amplifier. However, when a full C-Band EDFA with high dynamic gain range is required, linear tilt compensation by placing a Tm doped fiber at the EDFA mid-stage will not suffice. In this case only a carefully selected combination of Erbium and Tm doped fibers as well as a gain flattening filter, along with well-chosen pump sharing between the EDFA stages (referred to hereinafter as a "synergistic action or effect"), will yield high dynamic gain range in the entire C-Band.

Figure 3:
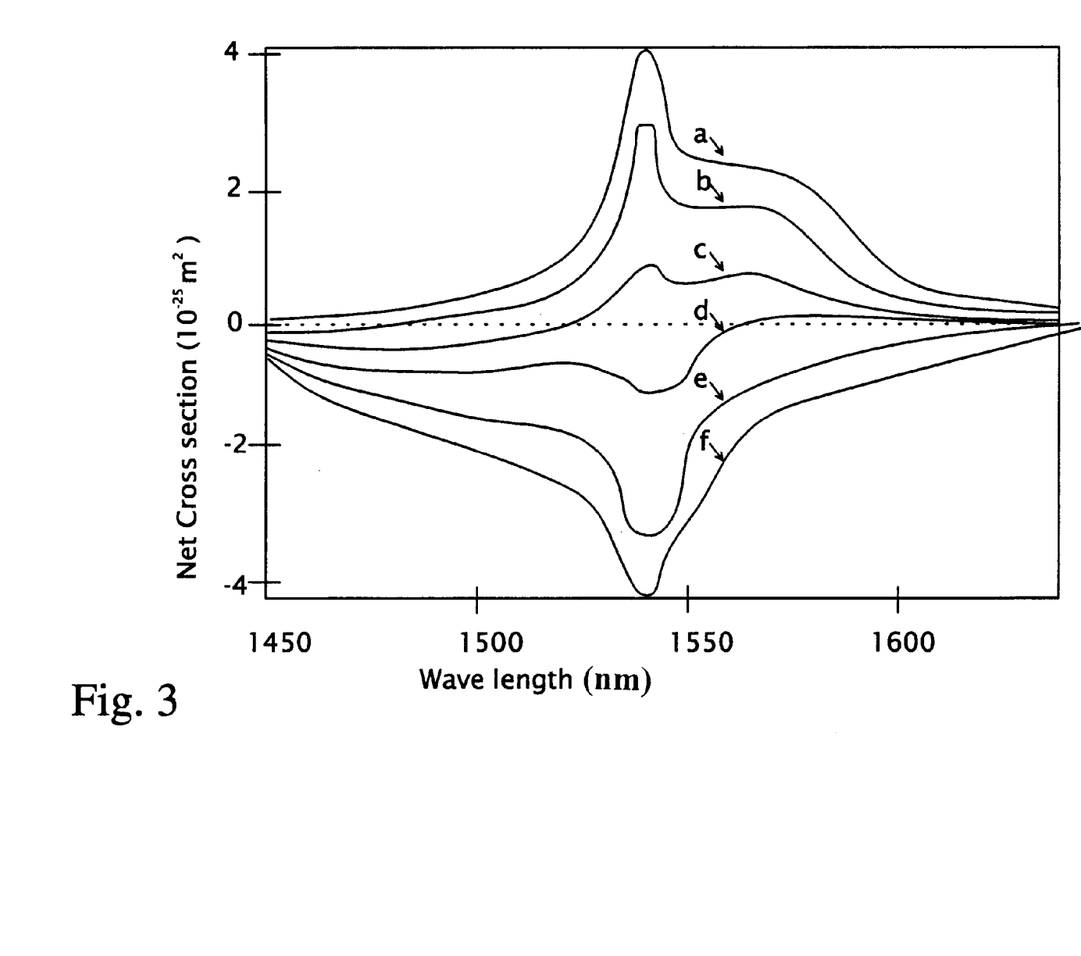
FIG. 3 shows the net cross section of an Erbium doped fiber near 1550 nm for different values of fractional population inversion or pump power level. The linear (1540–1565 nm) and non-linear regimes (1530–1540 nm) are easily noticeable.

FIG. 3 shows the net cross sections of an Erbium doped fiber near 1550 nm for different values of fractional population inversion or, alternatively pump power level. The linear (1540–1565 nm) and non-linear regimes (1530–1540 nm) are easily noticeable.

Figure 4:
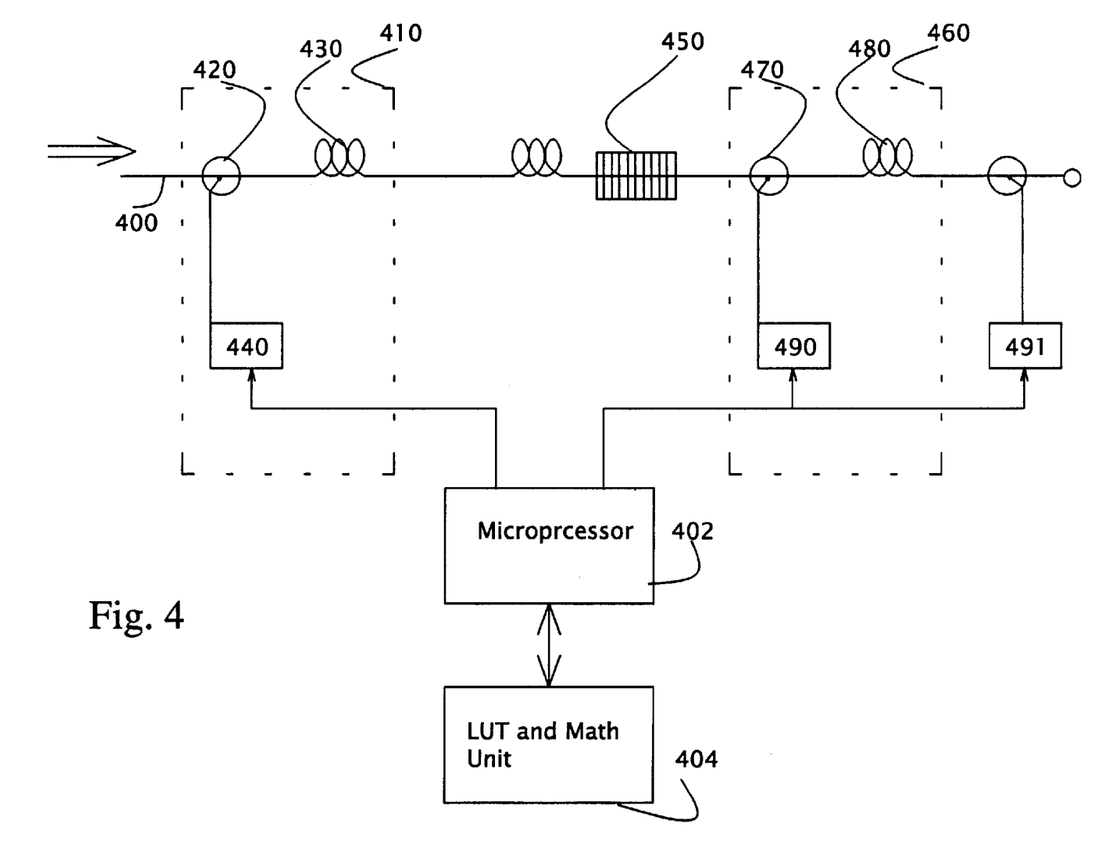
FIG. 4 shows a preferred embodiment of the full C-Band dynamic gain equalizer according to the present invention.

A detailed description of an exemplary preferred embodiment of the dynamic gain equalizer of the present invention is shown in FIG. 4, where a transmission line 400 passes through a first amplifier stage 410, stage 410 comprising a wavelength division multiplexing coupler 420, one or more Erbium-doped optical fibers 430, and an optical fiber line pump 440. The output optical signals of stage 410 are introduced into an optical absorber 442, preferably a Tm-doped silica or alternative host fiber. Absorber 442 serves as a self-saturable absorber for the output of first amplifier stage 410. Since a Tm-fiber represents the most preferred embodiment of absorber 442, we will refer hereafter to all embodiments of the absorber as "Tm-fiber". The Tm-fiber output signals pass through an optional passive gain flattening filter 450 into a second amplifier stage 460.

The second stage also comprises a wavelength division multiplexing coupler 470, one or more Erbium-doped optical fibers 480, and optical fiber line pumps 490 and 491 for achieving high output power. In the event that second stage 460 is unable to provide the desired gain across various wavelengths, passive filter 450 can provide additional filtering to achieve equalization. A microprocessor 402 and a mathematical analyzing unit 404 that includes extensive software algorithms and look-up tables, control the pump power level required for achieving gain flattening at all working points within the dynamic gain-input power range. As discussed earlier, optical fibers might be doped with other elements besides Erbium, in order to provide a means of amplifying light at additional wavelengths, or as sensitizers for the Erbium ions.

In essence, second amplifier stage 460 is pumped to an extent that provides inverted gain spectra features in comparison to the spectral shape of the Erbium-fiber of first stage 410. At the high gain edge of the dynamic gain region, whereas first stage 410 is highly pumped and its gain tilt is positive (high fractional population inversion, illustrated in FIG. 3 curve a), second stage 460 compensates for this tilt by lowering its pumping level (low fractional population inversion, illustrated in FIG. 3, curve f). Tm-fiber 442, located at the first stage output, is saturated by high output power of the first stage. This saturation, combined with the inverted spectral gain shape of the two amplifier stages, lowers the positive spectral tilt and the gain non-uniformity at 1530–1540 nm. Moreover, in the linear amplification regime (1540–1565 nm), the Tm saturation combined with near-threshold second stage 460 operation (curve d, FIG. 3) lowers the positive spectral tilt manifested by the first stage (curve a, FIG. 3). This is achieved by combining the lowered Tm saturated absorption at the high spectral end, with the amplification of the channels at this spectral range by the near threshold second stage 460 operation. The near-threshold operation yields energy transfer from the high power, low wavelength channels, to the low power, high wavelength channels.

Alternatively, when the low gain edge of the dynamic gain region is employed, whereas the first stage 410 pumping is low and its gain tilt is negative (curve c, FIG. 3), the signals pass through Tm-fiber 442 and experience small signal or nearly small signal Tm absorption. Consequently, the gain tilt manifested at the first stage output, increases after passing through the Tm-fiber at the mid-stage. In addition, by increasing the second stage 460 pump level, further compensation for this tilt and for the non-uniform behavior of the first stage at 1530–1540 nm, can be achieved (curve a, FIG. 3). This pump level increase flattens and amplifies the non-uniform low power channels at 1530–1540 nm, and adds to the Tm-fiber small-signal absorption trend of the high power 1540–1565 nm channels by having a relatively low gain in this spectral region (as can be seen from curve a, FIG. 3). The pump diode power levels are controlled by microprocessor 402, preferably using software algorithms that are typically supported by look-up tables (LUTs) 404. The look-up tables preferably define the pump powers required for each working point within the gain-input power dynamic range. In conclusion, the overall flattening tolerances at the high and low gain edges of the dynamic gain range over the entire C-Band, are better when compared to the ones achieved in prior art apparatus (FIG. 2). This outcome, achieved by adding a Tm-fiber at the mid-stage of a dual-stage EDFA, combined with complementary spectral gain shapes in the amplifier stages, and with algorithms implemented in software for controlling the various pump powers, allows the expansion of the amplifier dynamic range over the entire C-Band.

Figure 5:
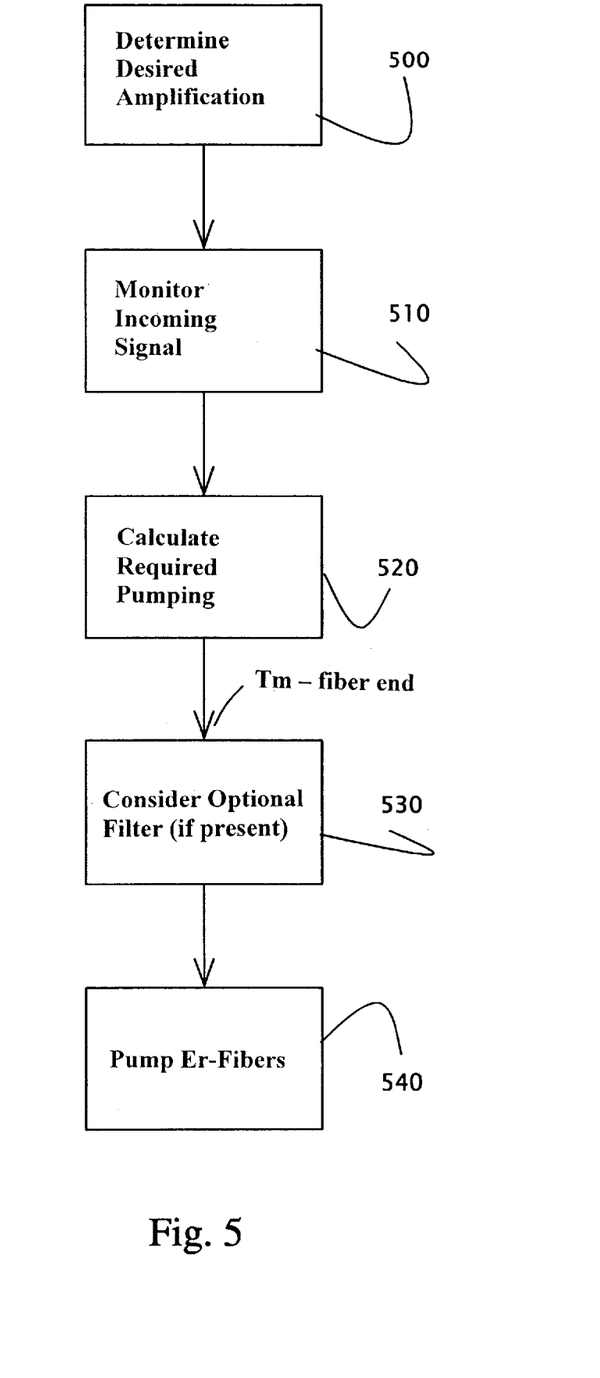
FIG. 5 shows an exemplary process of equalizing the wavelength-distributed channels, in the embodiment of FIG. 4.

An exemplary method or process for equalizing the wavelengths, using the embodiment of FIG. 4, is illustrated in FIG. 5. The method is based on a synergistic action that includes pumping of the two amplifier stages and the saturation of the self-saturating absorber. At an amplification determination step 500, a processing unit (not shown) determines the amplification that is desired from user input. The power of incoming signal is monitored at a signal-monitoring step 510. At a pumping calculation step 520, the processing unit calculates (or retrieves data from a predetermined LUT) the required amount of Erbium pumping power, or excitation, to be provided for each of the amplifier stages, by varying the pump lasers through its optical pump fibers (440 and 490, 491 in FIG. 4). The presence of a dichroic or other passive filter is considered at a filter check step 530. At a pumping step 540, the Erbium-doped fiber or fibers, are pumped to the desired level. The degree of optical pumping desired is determined by consideration of a number of factors, including: (1) the input and output power of the associated Erbium-doped fiber amplifier, (2) the data regarding properties of the dichroic filter, if any, (3) the Tm-doped fiber saturation degree, (4) the data in a look-up table providing Erbium-doped optical fibers properties of both EDFA stages and (5) information regarding the specific wavelengths transmitted by the fiber—if existing.

By including a Tm-doped fiber saturable absorber at the mid-stage of a dual stage EDFA with two identical Erbium fibers, the dynamic gain range of the amplifier can be approximated by the following relation, $$\Delta G = G_{max} - G_{min} = \frac{(\sigma_{e(\lambda 1)} + \sigma_{a(\lambda 1)}) + (\sigma_{e(\lambda 2)} + \sigma_{a(\lambda 2)})}{(\sigma_{e(\lambda 1)} + \sigma_{a(\lambda 1)}) - (\sigma_{e(\lambda 2)} + \sigma_{a(\lambda 2)})} \cdot \Delta T +$$

$$\frac{(\sigma_{e(\lambda 1)} + \sigma_{a(\lambda 1)})}{(\sigma_{e(\lambda 1)} + \sigma_{a(\lambda 1)}) - (\sigma_{e(\lambda 2)} + \sigma_{a(\lambda 2)})} \cdot \Delta f(\lambda 2)$$

where all symbols have the same meaning as above, and where $\Delta f(\lambda 2)$ is the difference at $\lambda_2$ between the Tm-fiber attenuation (in dB) at the low operating edge of the dynamic gain range (small signal absorption), and its attenuation at the high operating edge of the dynamic gain range (saturated absorption).

As an example, if the original dynamic gain range of a dual stage EDFA, constructed from one Erbium-doped fiber was 3.5, as mentioned earlier, and $\Delta f(\lambda 2)=3$ dB, the theoretical dynamic gain range with the addition of a Tm-fiber and utilization of its saturation characteristics combined with those of the Erbium doped fibers, within a flattening tolerance (?T) of 1.5 dB, will grow to 9 dB. When different Erbium fibers are employed at each of the EDFA stages, the theoretical dynamic gain range with the presence of Tm-fiber will grow according to the following relation $$\Delta G = G_{max} - G_{min} =$$

$$\frac{((\sigma_{e1(\lambda 1)} + \sigma_{a1(\lambda 1)}) + (\sigma_{e1(\lambda 2)} + \sigma_{a1(\lambda 2)})) \cdot (\overline{n^*_{G_{max}}} - \overline{n^*_{G_{min}}}) \cdot L_1 +}{((\sigma_{e1(\lambda 1)} + \sigma_{a1(\lambda 1)}) - (\sigma_{e1(\lambda 2)} + \sigma_{a1(\lambda 2)})) \cdot (\overline{n^*_{G_{max}}} - \overline{n^*_{G_{min}}}) \cdot L_1 +}$$
$$\frac{(\sigma_{e2(\lambda 1)} + \sigma_{a2(\lambda 1)}) + (\sigma_{e2(\lambda 2)} + \sigma_{a2(\lambda 2)})) \cdot (\overline{N^*_{G_{max}}} - \overline{N^*_{G_{min}}}) \cdot L_2}{((\sigma_{e2(\lambda 1)} + \sigma_{a2(\lambda 1)}) - (\sigma_{e2(\lambda 2)} + \sigma_{a2(\lambda 2)})) \cdot (\overline{N^*_{G_{max}}} - \overline{N^*_{G_{min}}}) \cdot L_2} \cdot \Delta T +$$

$$\frac{(\sigma_{e1(\lambda 1)} + \sigma_{a1(\lambda 1)}) \cdot (\overline{n^*_{G_{max}}} - \overline{n^*_{G_{min}}}) \cdot L_1 +}{((\sigma_{e1(\lambda 1)} + \sigma_{a1(\lambda 1)}) - (\sigma_{e1(\lambda 2)} + \sigma_{a1(\lambda 2)})) \cdot (\overline{n^*_{G_{max}}} - \overline{n^*_{G_{min}}}) \cdot L_1 +}$$
$$\frac{(\sigma_{e2(\lambda 1)} + \sigma_{a2(\lambda 1)}) \cdot (\overline{N^*_{G_{max}}} - \overline{N^*_{G_{min}}}) \cdot L_2}{((\sigma_{e2(\lambda 1)} + \sigma_{a2(\lambda 1)}) - (\sigma_{e2(\lambda 2)} + \sigma_{a2(\lambda 2)})) \cdot (\overline{N^*_{G_{max}}} - \overline{N^*_{G_{min}}}) \cdot L_2} \cdot$$

$$\Delta f(\lambda 2)$$

where all symbols have been defined previously

Figure 6A:
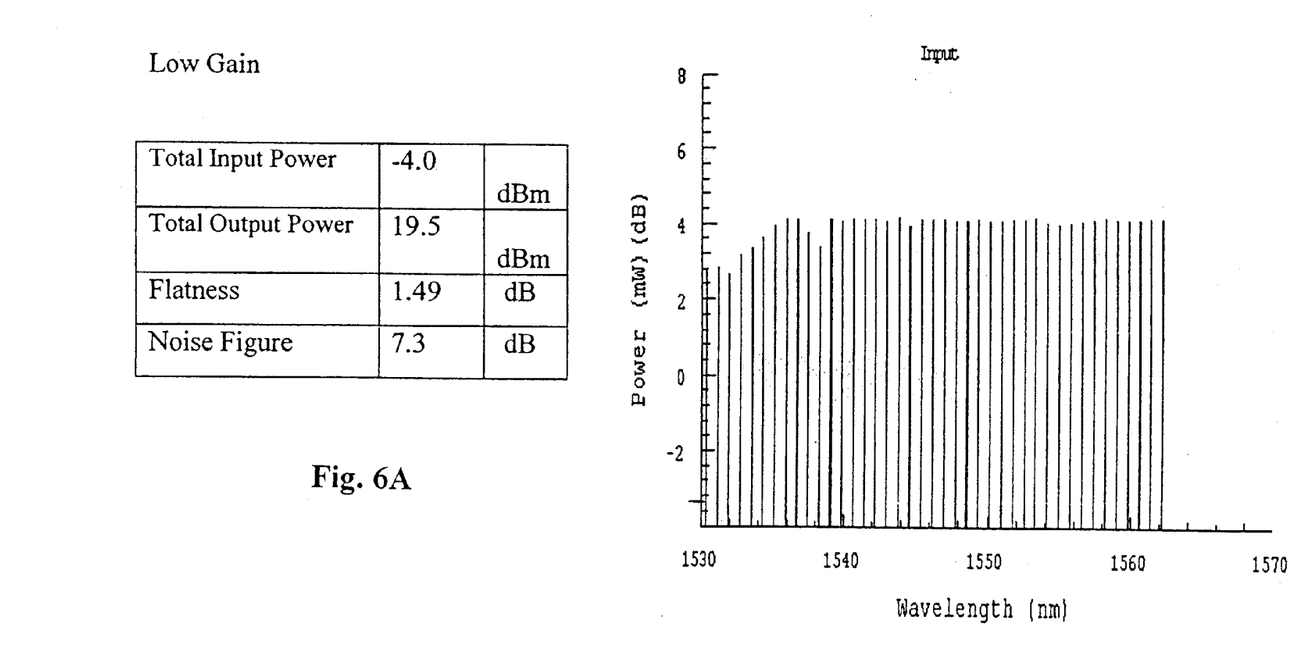
FIG. 6 is an example of the performance of a dynamic gain dual-stage EDFA of FIG. 4, in the entire C-Band range.
Figure 6B:
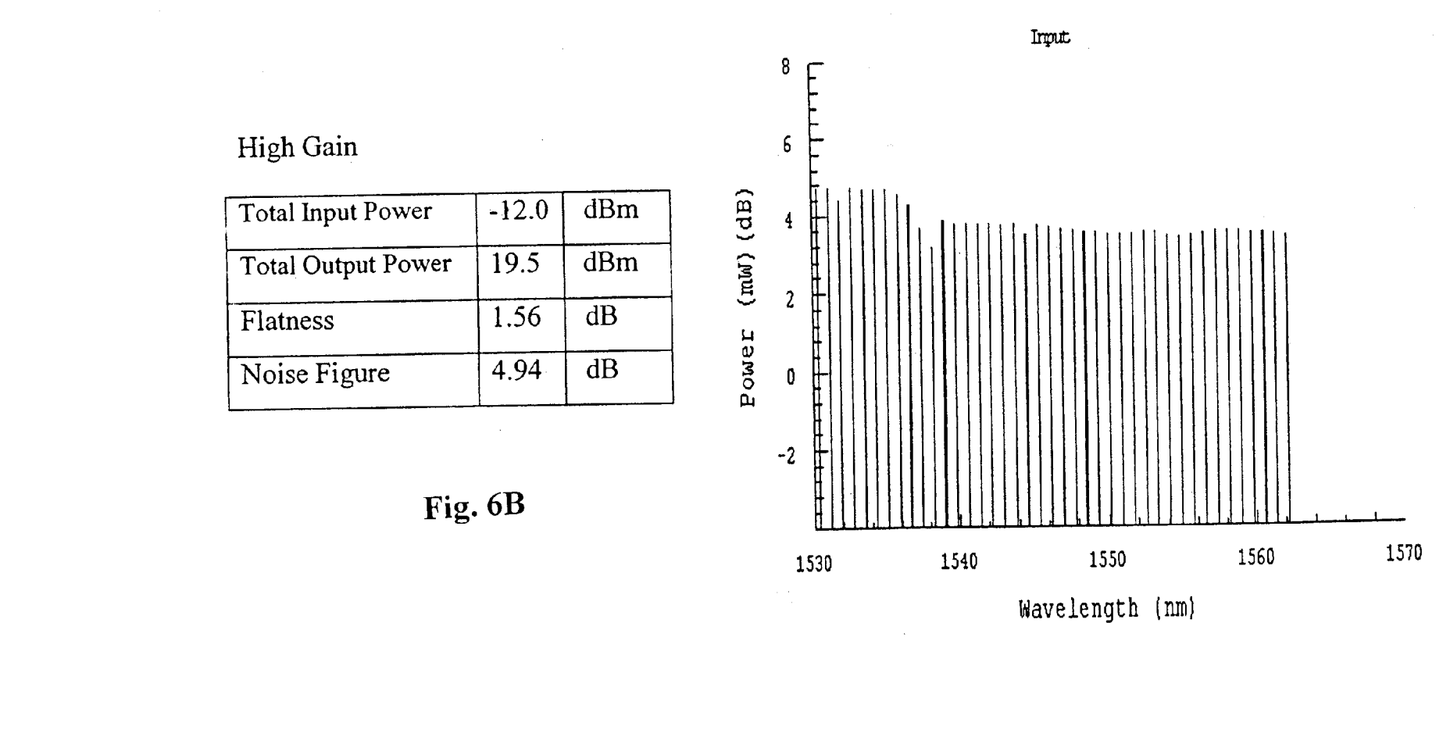

FIG. 6 shows an example of the performance of the full C-Band dynamic gain dual-stage EDFA of the present invention, as embodied by the preferred embodiment of FIG. 4. The two amplifier stages contain identical Erbium-doped fibers, a gain flattening filter and a dispersion compensating fiber at the mid-stage. At the low edge of the dynamic range, (low gain/high input power), FIG. 6(a), where the required gain is the lowest and the input power is the highest, the gain tilt of the entire amplifier is, as expected, negative, and its value reaches 1.5 dB. Alternatively, at the high edge of the dynamic range, (high gain/low input power), FIG. 6(b), where the required gain is the highest and the input power is the lowest, the gain tilt of the entire amplifier is, as expected, positive, and its value reaches 1.5 dB. The output power is the same at these two edges and along the line connecting between them, (the "constant power line"). A constant gain operating regime is possible as well, and is illustrated also in FIG. 7 as a "constant gain line"

Figure 7:
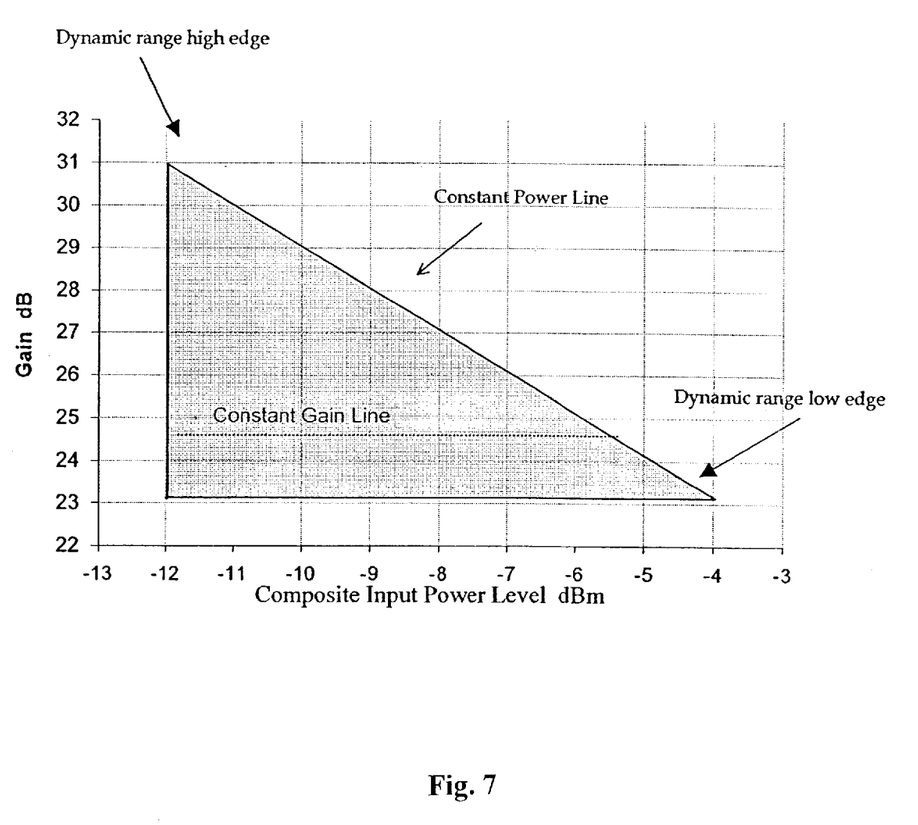
FIG. 7 shows the dynamic gain range of the EDFA of FIG. 4.

The amplifier's dynamic gain range is shown in FIG. 7, where the shaded area in the drawing denotes the operating range of the amplifier. Within 1.5 dB flattening tolerance, the dynamic gain range reaches 8 dB. The two edges of the dynamic range in which the overall gain tilt is the worst, are also shown in the drawing.

Figure 8:
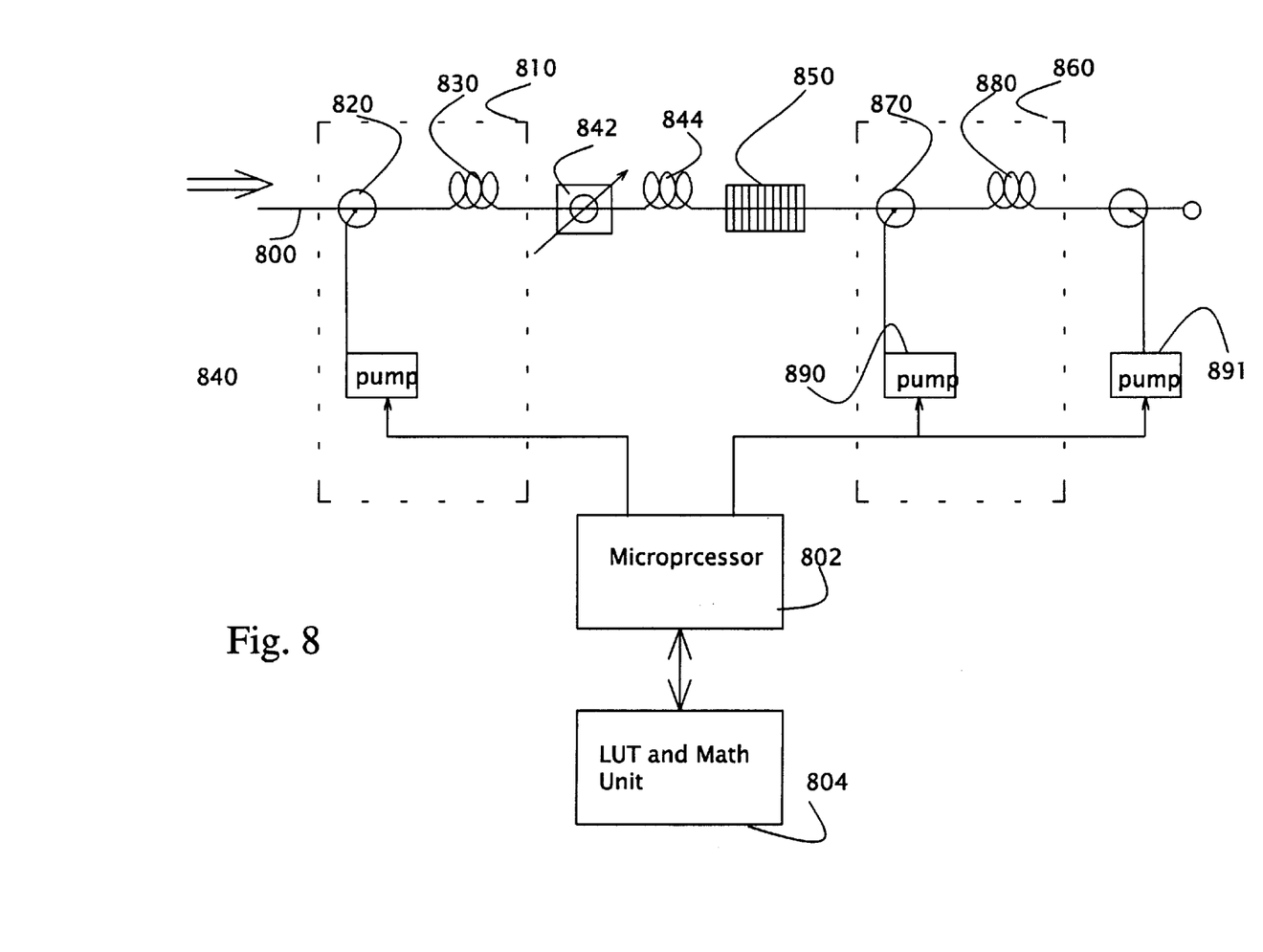
FIG. 8 shows another preferred embodiment of the full C-Band dynamic gain equalizer according to the present invention.

An additional preferred embodiment of the full C-Band dynamic gain equalizer of the present invention is shown in FIG. 8, where a transmission line 800 passes through a first amplifier stage 810, stage 810 comprised of a wavelength division multiplexing coupler 820, one or more Erbium-doped optical fibers 830, and an optical fiber line pump 840. The output signals of the first stage are introduced into a Variable Optical Attenuator (VOA) 842 to produce attenuated signals. The attenuated signals are introduced into a Tm-doped silica or alternative host fiber 844, which creates a saturable absorber for the first amplifier output. The Tm-fiber output signals may pass through an optional passive filter 850 followed by the second amplifier stage 860. Second stage 860 is comprised of a wavelength division multiplexing coupler 870, one or more Erbium-doped optical fibers 880, and optical fiber line pumps 890 and 891 for achieving high output power. In the event that second stage 860 is unable to provide the desired gain across various wavelengths, passive filter 850 can provide additional filtering to achieve equalization. A microprocessor 802 and a mathematical analyzing unit 804 having extensive software algorithms and look-up tables, control the pump power level required for achieving gain flattening at all working points within the dynamic gain-input power range.

As discussed earlier, optical fibers might be doped with other elements besides Erbium, in order to provide a means of amplifying light at additional wavelengths or as sensitizers for the Erbium ions.

The flattening of the amplifier in the present embodiment is done through controlling the amount of saturation imposed on absorber 844 by VOA 842 and the spectral gain shape of the amplifier's second stage 860.

In essence, second stage 860 is pumped to an extent that provides inverted gain spectra features in comparison to the spectral shape of first stage 810. In the high-gain region, whereas first stage 810 is highly pumped and its gain tilt is positive, second stage 860 compensates for this tilt by lowering its pumping level, using pumps 890 and 891. The mid-stage VOA 842 is adjusted to its minimum attenuation value, resulting in high saturation of Tm-fiber 844, located at its output. Consequently, the positive spectral tilt of first stage 810, in the linear gain regime (1540–1565 nm), is lowered compared to the "small signal" spectral tilt of the Tm-fiber, which is shown in FIG. 1. In addition, the overall mid-stage loss is low due to the low attenuation of VOA 842, combined with the low characteristic insertion loss of the saturated Tm-fiber 844 (FIG. 1), resulting in even further lowering of the positive spectral tilt. The inverted spectral shape of the first and second amplifier stages, 810 and 860, compensates for the non-uniformity in the non-linear gain regime (1530–1540 nm), and assists the spectral tilt lowering imposed by the saturated Tm-fiber-VOA combination at the linear gain regime, 1540–1565 nm, as explained in the previous embodiment in FIG. 4.

Alternatively, in the low-gain region, whereas the first stage 810 linear gain tilt is negative at 1540–1565 nm, VOA 842 is adjusted to high attenuation so that the attenuated signals, coming from first stage 810, pass through Tm-fiber 844 and experience small signal or nearly small signal Tm absorption. Consequently, the Tm-fiber gain tilt increases due to the high overall absorption of VOA 842 and the small signal Tm 844. The wavelength-dependent small signal Tm 844 absorption (FIG. 1), contributes additional tilt compensation. The compensation for the remaining gain tilt of second stage 860, which occurs by increasing the stage 860 pumping level, is much better compared with the previous apparatii in FIG. 2 and FIG. 4. Moreover, the non-uniform gain at 1530–1540 nm is flattened by the complementary spectral gain shapes of the first and second stages, as explained in the previous embodiment (FIG. 4). In conclusion, the overall flattening tolerances at the high and low gain edges of the amplifier's original dynamic gain range are much better at both linear (1540–1565 nm) and non-linear (1530–1540 nm) regimes at the C-Band, compared to the ones achieved in previous embodiments (FIG. 2 and FIG. 4). This outcome, achieved by adding the combination of VOA+Tm-fiber at the mid-stage of a dual-stage EDFA and utilizing the saturation absorption-emission characteristics of the Tm and Erbium doped fibers, combined with algorithms implemented in software for controlling the various pump powers and the VOA attenuation, allows the expansion of the amplifier's dynamic range to the entire C-Band. It should be noted that for a specific selection of working gain/input-power region and Noise Figure limitation, an optimization of the Er and Tm-fiber lengths vs. the VOA attenuation range should be done, yielding a specific value characterizing this working region optimal performance. Note however that the addition of a VOA adds cost to the system in terms of optics, electronics, and software required.

Figure 9A:
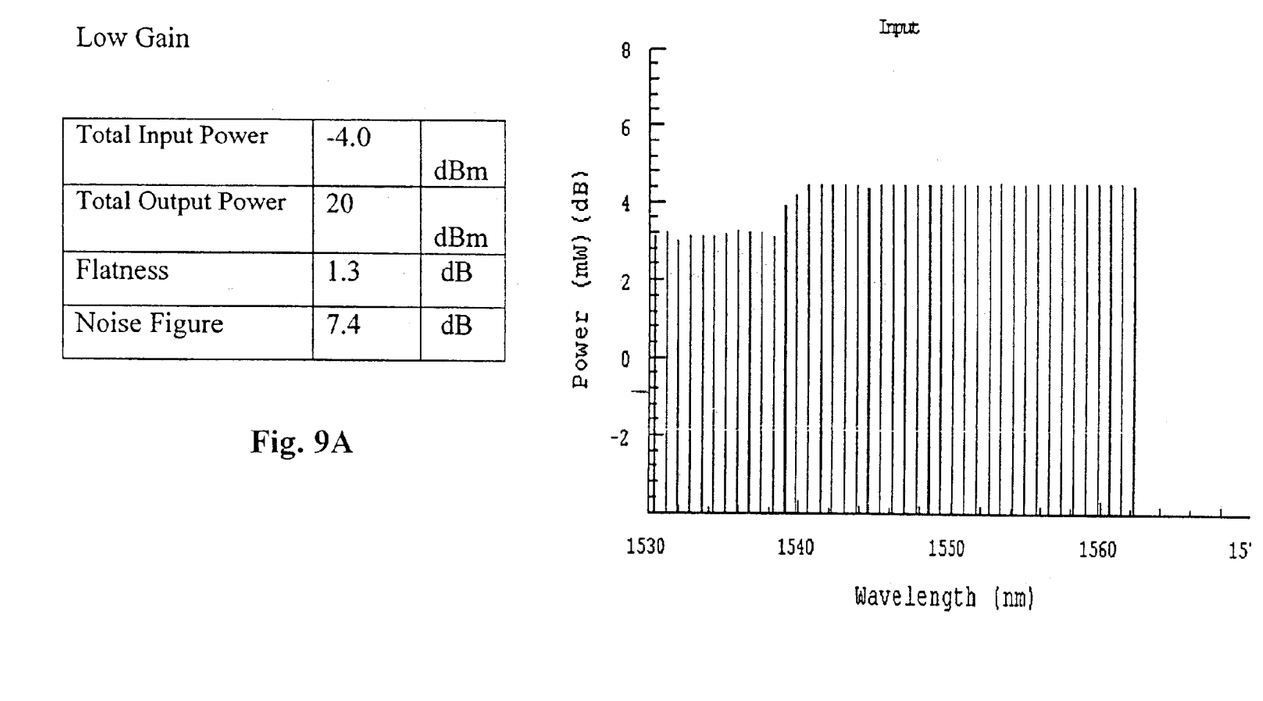
FIG. 9 is an example of the performance of the embodiment of the dynamic gain dual-stage EDFA shown in FIG. 8, in the whole C-Band range.
Figure 9B:
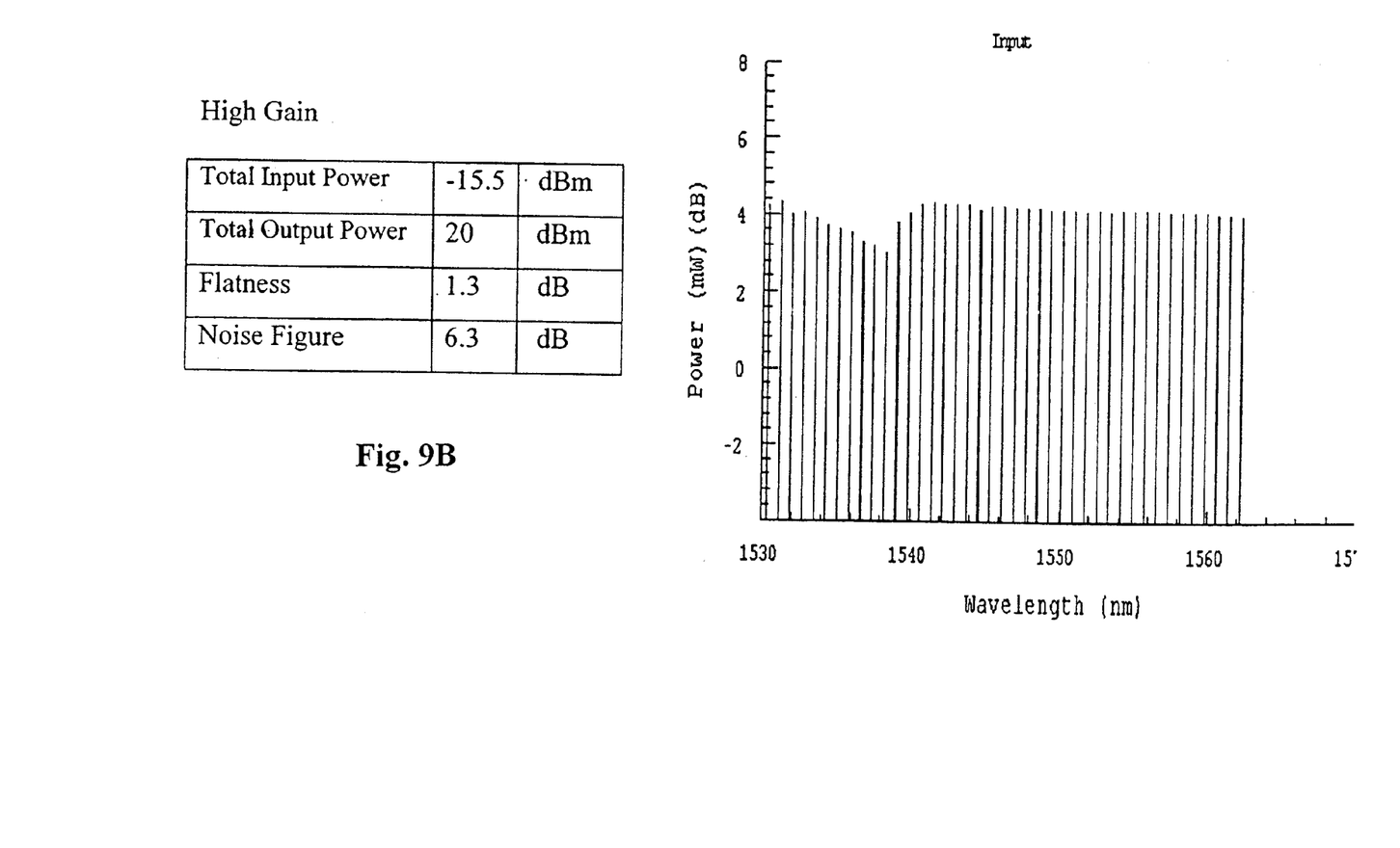

FIG. 9 shows an example of the performance of the full C-Band dynamic gain dual-stage EDFA of the present invention, as embodied by the preferred embodiment of FIG. 8, which employs an optimal combination of Er and Tm-doped silica fibers, and a VOA at the mid-stage. The dual-stage EDFA is comprised of identical Erbium-doped fibers, a gain flattening filter and a dispersion compensating fiber at the mid-stage. At the low edge of the dynamic range, FIG. 9(a), the gain tilt, as expected, is negative and its value reaches 1.3 dB. At the high edge of the dynamic range, FIG. 9(b), the gain tilt, as expected, is positive and its value reaches 1.3 dB. The output power is the same at these two edges and along the line connecting between them, the "constant power line". A constant gain operating regime is possible as well and is illustrated also in FIG. 10 as a "constant gain line".

Figure 10:
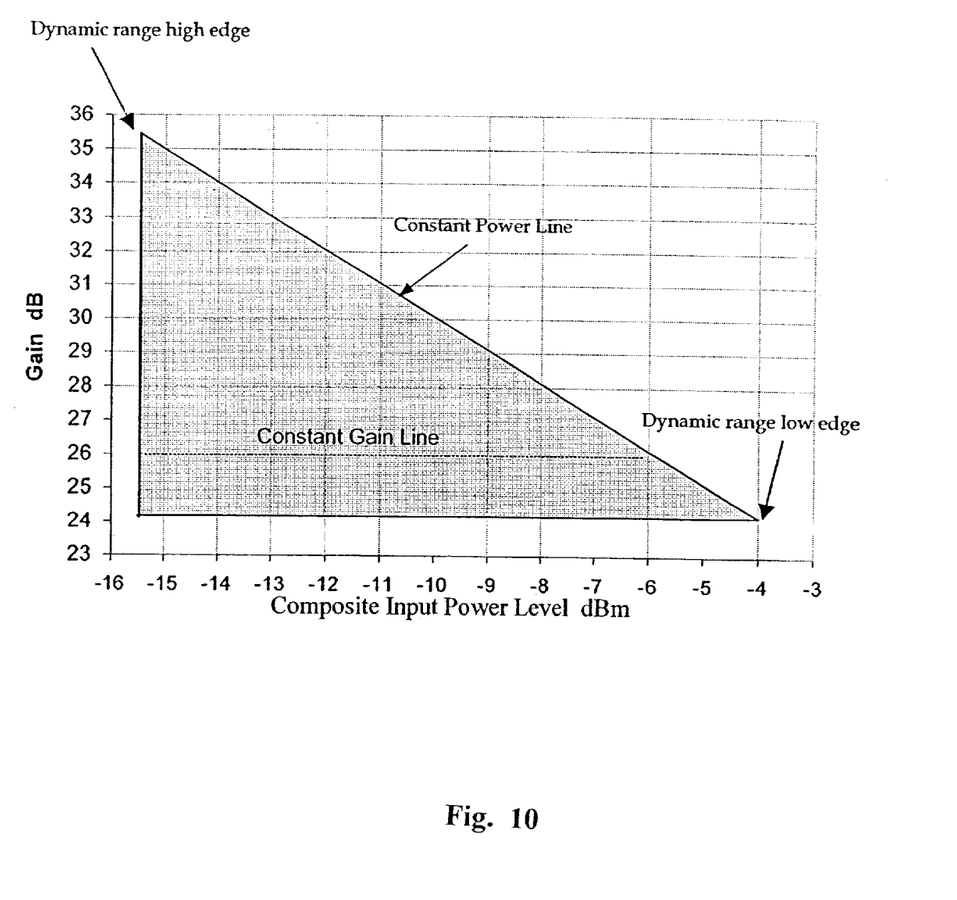
FIG. 10 shows the dynamic gain range of the EDFA of FIG. 8.

The dynamic gain range of the embodiment of FIG. 8 is shown in FIG. 10, where the shaded area in the drawing denotes the operating range of the amplifier. Within 1.3 dB flattening tolerance, the dynamic gain range reaches 11.5 dB over the entire C-Band. The two edges of the dynamic range in which the overall gain tilt is the worst, are shown in the FIG. 10. The dynamic gain range, achieved in this example, is limited to 11.5 dB due to a 7.5 dB Noise Figure constraint. The dynamic gain range can be further increased if higher Noise Figure values are allowed.

The method of equalizing the wavelengths using the embodiment of FIG. 8 is similar to that of the previous embodiment, illustrated in FIG. 5, except that VOA adjustment considerations should also be taken into account for steps parallel to 520 and 540 in FIG. 5.

All publications, patents and patent applications mentioned in this specification are herein incorporated in their entirety by reference, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A method for dynamic gain equalization in an optical fiber system, comprising
   a. providing a plurality of rare-earth doped amplifier stages;
   b. providing a self-saturable absorber optically connected between each two of said plurality of rare-earth amplifier stages, said each two stages including a first and a second stage; and
   c. synergistically controlling the pumping of said first and second stages and the saturation of said self-saturable absorber connected therebetween, whereby the combined action of said pumping and said saturation provides gain equalization over a wide spectral range covering the entire C-band.

2. The method of claim 1, wherein said step of providing a plurality of rare-earth amplifier stages includes providing a plurality of Erbium-doped silica fibers, and wherein said step of providing a self-saturable absorber includes providing a Thulium-doped fiber.

3. The method of claim 2, wherein said step of controlling the pumping further includes pumping each said first and second Erbium-doped fiber stages to achieve respective complementary first and second spectral shapes, and wherein said step of controlling the saturation includes using an output power signal of said first stage to saturate said Thulium-doped fiber.

4. The method of claim 2, wherein said first and second Erbium-doped fibers are identical.

5. The method of claim 2, wherein said Erbium-doped fibers present different spectroscopic characteristics.

6. The method of claim 3 further comprising optically connecting a variable optical absorber between said first stage and said Thulium-doped fiber, wherein said step of controlling the said Thulium-doped fiber saturation includes using different absorption values in said variable optical absorber.

7. An apparatus for dynamic gain equalization over the entire C-Band in an optical fiber system, comprising
   a. a plurality of rare-earth doped amplifier stages, each two of said plurality including a first and a second stage;
   b. a self-saturable absorber optically connected therebetween said first and second amplifier stages, said self-saturable absorber having a saturation property controlled by an output signal of at least one of said first and second stages; and
   c. control means for controlling an optical property of each of said first and second stages, said control means facilitating a synergistic action of said first and second stages and said self-saturable absorber, whereby said synergistic action provides optical gain equalization over a wide spectral range covering the entire C-band.

8. The apparatus of claim 7, wherein said rare-earth doped amplifier stages include Erbium-doped fiber stages, and wherein said self-saturable absorber includes a Thulium-doped fiber.

9. The apparatus of claim 8, wherein said optical property of said first and second stages includes a spectral non-uniformity.

10. The apparatus of claim 8, wherein said spectral non-uniformity included a gain tilt.

11. The apparatus of claim 7 further comprising a variable optical absorber connected therebetween said first stage and said self-saturating absorber.

12. A method for dynamically equalizing the optical gain across both the linear and non-linear regimes of the C-Band, comprising:
    a. providing at least one dual-stage Erbium doped fiber amplifier having a first stage and a second stage;
    b. optically connecting a Thulium-doped fiber between said first and second stages;
    c. synergistically controlling the spectral output of said first and said second stages; and
    d. using said spectral output of said first stage to affect an optical characteristic of said Thulium-doped fiber, said affected optical characteristic combining with said first and second spectral outputs to induce a substantially equalized gain across the C-Band.

13. The method of claim 12, wherein said step of synergistically controlling includes determining a desired optical pumping level for each of said first and second stages, said determining substep further including considering a number of factors.

14. The method of claim 13, wherein said considering a number of factors includes considering factors selected from the group consisting of an input power of said dual-stage amplifier, an output power of said dual-stage amplifier, a degree of saturation of said Tm-doped fiber, optical properties of said first and second stages and transmitted wavelength related data.

15. The method of claim 12, further comprising optically connecting a variable optical absorber between said first stage and said Thulium fiber.

* * * * *